United States Patent [19]
Divine et al.

[11] 3,854,226
[45] Dec. 17, 1974

[54] ELECTRONICALLY OPERATED MACHINE FOR TEACHING MATHEMATICS

[76] Inventors: David L. Divine; Darrell L. Vines, both of P.O. Box 16305, Lubbock, Tex. 79490

[22] Filed: Aug. 20, 1973

[21] Appl. No.: 389,698

[52] U.S. Cl. .................................. 35/31 C, 35/9 B
[51] Int. Cl. ............................................ G09b 19/02
[58] Field of Search .......... 35/31 R, 31 C, 9 R, 9 B, 35/30

[56] References Cited
UNITED STATES PATENTS

| | | | |
|---|---|---|---|
| 2,695,462 | 11/1954 | Gilbert | 35/31 D |
| 2,842,871 | 7/1958 | Laird | 35/31 R |
| 2,970,386 | 2/1961 | Knutson | 35/31 C |
| 3,052,041 | 9/1962 | Luxton | 35/9 E |
| 3,230,640 | 1/1966 | Mueller | 35/9 E |
| 3,350,793 | 11/1967 | Bushnell | 35/9 B |
| 3,395,464 | 8/1968 | Leslie | 35/9 A |
| 3,584,398 | 6/1971 | Meyer et al. | 35/31 C |
| 3,624,687 | 11/1971 | Cagnolatti | 35/31 C |
| 3,694,932 | 10/1972 | McGrath | 35/31 B |
| 3,699,667 | 10/1972 | Gomez | 35/31 C |

*Primary Examiner*—Wm. H. Grieb
*Attorney, Agent, or Firm*—Wendell Coffee

[57] ABSTRACT

An electronic teaching machine for teaching addition, subtraction, multiplication and division of positive integers from 0 to 15 to students in the primary grades. The machine is of simple, durable construction and requires little or no instruction for its use. It is meant for utilization by one student, but two or more can use the machine in a gaming situation. The student enters his equation (problem and solution) via thumbwheel switches arranged from left to right on the face of the machine. The student then depresses the test switch and the machine responds with "RIGHT", "WRONG", or "THE ANSWER IS A FRACTION." The machine is uniquely simple in that it remembers correct solutions to problems instead of calculating them. This allows for long life and device simplicity.

8 Claims, 4 Drawing Figures

3,854,226

ELECTRONICALLY OPERATED MACHINE FOR TEACHING MATHEMATICS

BACKGROUND OF THE INVENTION

1 Field of the Invention

This invention relates to teaching machines or devices which are intended to aid primary grade students in the comprehension of basic mathematical operations. That is, the addition, subtraction, multiplication or division of positive integers.

2 Description of the Prior Art:

Probably the most widely used device for the memorization of math tables is the flash card. The flash card is generally used in schools in group situations and in the home in a one-on-one situation. Because the teacher often does not have time for small group or individual attention and family instability often does not allow the one-on-one relationship at home, several machines have been developed to allow the student to work individually at learning his mathematics tables.

Many existing machines are quite elaborate and capable of performing many teaching functions; for example, there are computer systems with a terminal for each student. However, machines of this nature are expensive and, therefore, the number of children reached is very small. Other machines include ones such as that disclosed in GOMEZ, U.S. Pat. No. 3,699,667. Although less complicated than a full computer system, GOMEZ is still complex and the teacher must be involved with its use.

Another mechanical device is described in CAGNOLATTI, U.S. Pat. No. 3,624,687. This device, although simpler, is limited to addition of pairs of one digit numbers. It is meant to be used only by one student with no teacher involvement. A mechanical machine of this nature would appear to be noisy.

Finally, a machine can become so simple that the student could rapidly lose interest in what he is doing. Although simple devices are generally inexpensive, they are also generally limited and require more than one student to operate. One such device of this type is described in McGRATH, U.S. Pat. No. 3,694,932.

Therefore, the need remains for a quiet, inexpensive, easily used teaching machine to motivate learning the mathematics tables.

Other U.S. Pats. considered during preparation of this specification include:

| Laird | 2,842,871 |
| Gilbert | 2,695,462 |
| Leslie | 3,395,464 |
| Luxton | 3,052,041 |
| Buxhnell | 3,350,793 |
| Mueller | 3,230,640 |

SUMMARY OF THE INVENTION:

1 New and Different Function

This machine is designed so that a student may enter his problem and solution and then check the equation, getting immediate response. The student can work at his own rate and by himself. The machine is made up of input devices (thumbwheel switches), a test switch, and three displays (RIGHT, WRONG, or THE ANSWER IS A FRACTION), electronics, and battery pack.

The machine, described in the detailed description and shown in the drawing, is based on the principle that the student will be so motivated by his correct equation that he will attempt the more difficult equations. An obvious extension of this invention would be to place displays in the problem side of the equation so the student would have to advance at the rate the machine specifies. The machine has been built with as many switches, bright lights, and colors, as possible to capture the student's interest in the machine. The operation of the machine would be as follows:

1. The student sets the function switch (the second thumb-wheel) to those math tables he is studying (addition, subtraction, multiplication, or division). Assume he chooses multiplication.
2. The student now enters his choice of multiplicand with the first thumbwheel switch (0–15). Assume he chooses 4.
3. Now he enters his choice of multiplier with the third thumbwheel switch (0–15). Assume he chooses 6.
4. Moving now to the right side of the equal sign (=), he uses the last three thumbwheel switches to enter his answer. The correct answer would be 024. Assume he chooses 026.
5. The student pushes the test button and observes the WRONG display light.
6. The student releases the button and corrects the right side of his equation. Assume he now enters 024.
7. Upon depressing the test button the student would see the RIGHT display light.
8. The student might now advance to a new problem.

From the preceding description, it can easily be seen how two students might use this device in a game fashion. One student would set the problem on the machine, and the other student would find the correct solution.

2 OBJECTS OF THE INVENTION:

An object of this invention is to teach children mathematical tables.

Further objects are to achieve the above with a device that is sturdy, compact, durable, lightweight, simple, safe, efficient, versatile, and reliable, yet inexpensive and easy to manufacture, install, adjust, operate, and maintain.

The specific nature of the invention, as well as other objects, uses, and advantages thereof, will clearly appear from the following description and from the accompanying drawing, the different views of which are not necessarily to the same scale.

Figure 1:
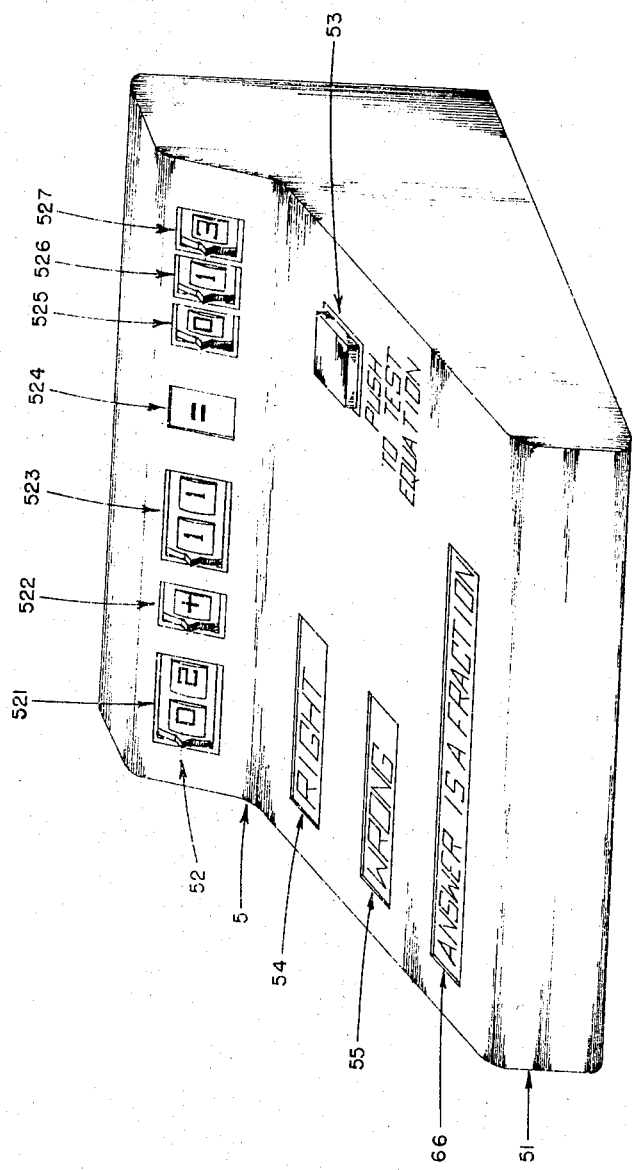
FIG. 1 is a perspective view of the teaching machine of the present invention.

DESCRIPTION OF THE PREFERRED EMBODIMENT:

Teaching machine 5 of the present invention is disclosed in perspective view in FIG. 1. The machine includes case 51 that supports the input-output devices and encloses the electronics and battery pack or power supply. The inputs consist of a band of thumbwheel switches 52 and momentary contact single-pole-single-throw spring switch 53. The following is a detailed description of the thumbwheel switches moving from left to right in FIG. 1:

First number switch 521 — 16 position, Binary Coded decimal output,

Function switch 522 — 10 position, Binary Coded decimal output, stops on Nos. 0–3: 0 position is stamped with +, 1 position is stamped with −, 2 position is stamped with X, and 3 position is stamped with ÷.

Second number switch 523 — 16 position, Binary Coded decimal output.

Dummy 524 — Blank body stamped with =.

First answer switch 525 — 10 position, Binary Coded decimal output, with stops on Nos. 0–3. The 3 position has been stamped with -.

Second answer switch 525 — 10 position, Binary Coded decimal output.

Third answer switch 527 — 10 position, Binary Coded decimal output.

As seen in the drawings, the problem is presented in a single line as an equation in the form commonly presented in algebra texts.

The output devices shown are window 54 which when lit displays RIGHT, window 55, which when lit, displays WRONG, and window 66, which when lit, displays THE ANSWER IS A FRACTION.

The teaching machine will contain four Read Only Memories (ROMs): ROM for addition 571, ROM for subtraction 572, ROM for multiplication 573, and ROM for division 574. Each of the four memories will contain 256 10-bit words.

For those not familiar with Read Only Memories, a brief discussion will be presented. A memory is a device made so that a unique address (input) will give a unique output. The memories utilized in the present invention are of the "read only" class. Also, these memories contain 256 words or groups of information. To be able to address each of these words with a binary code, an eight bit address is needed; one can obtain 256 unique combinations of "ones" and "zeros," thus allowing access to all work locations. Now, as stated previously, the word length in the memories is 10 bits. The significance of this will be discussed later.

Figure 2:
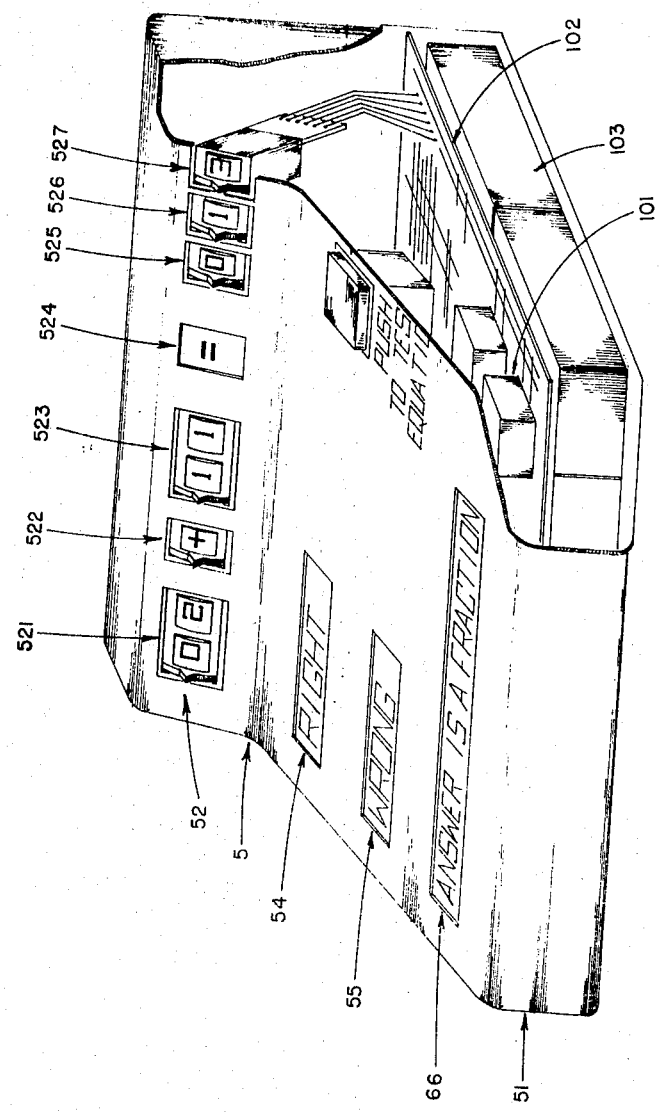
FIG. 2 is a cutaway perspective of the teaching machine.

Electronic components 101, printed circuit board 102, and battery pack 103, are illustrated in FIG. 2.

Figure 3:
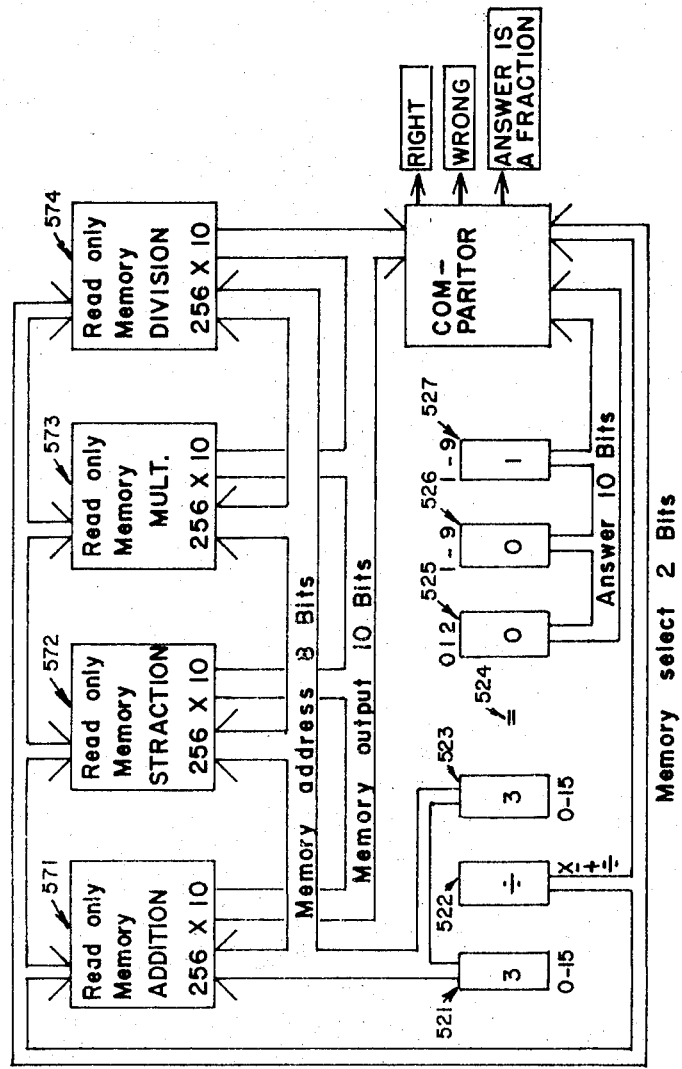
FIG. 3 is a block diagram of the functioning of the machine.

Referring to the block diagram FIG. 3, the logic of the teaching machine will now be discussed. The student begins by setting the function switch 522 to multiplication, division, addition, or subtraction. Depending on the switch he selects, a unique 2-bit code will be generated which will enable one of the four Read Only Memories 571, 572, 573, or 574. The memory which is enabled will contain the answers for given function. Once the memory is enabled, the student sets his problem. Both 16 position thumbwheel switches 521 and 523 will generate an address for the enabled Read Only Memory. This causes the correct answer to be generated on the output lines. The correct binary answer is then compared by the comparitor in the case to the student generated answer on answer switches 525, 526, and 527. The comparitor is actuated by depression of the spring switch 53.

Figure 4:
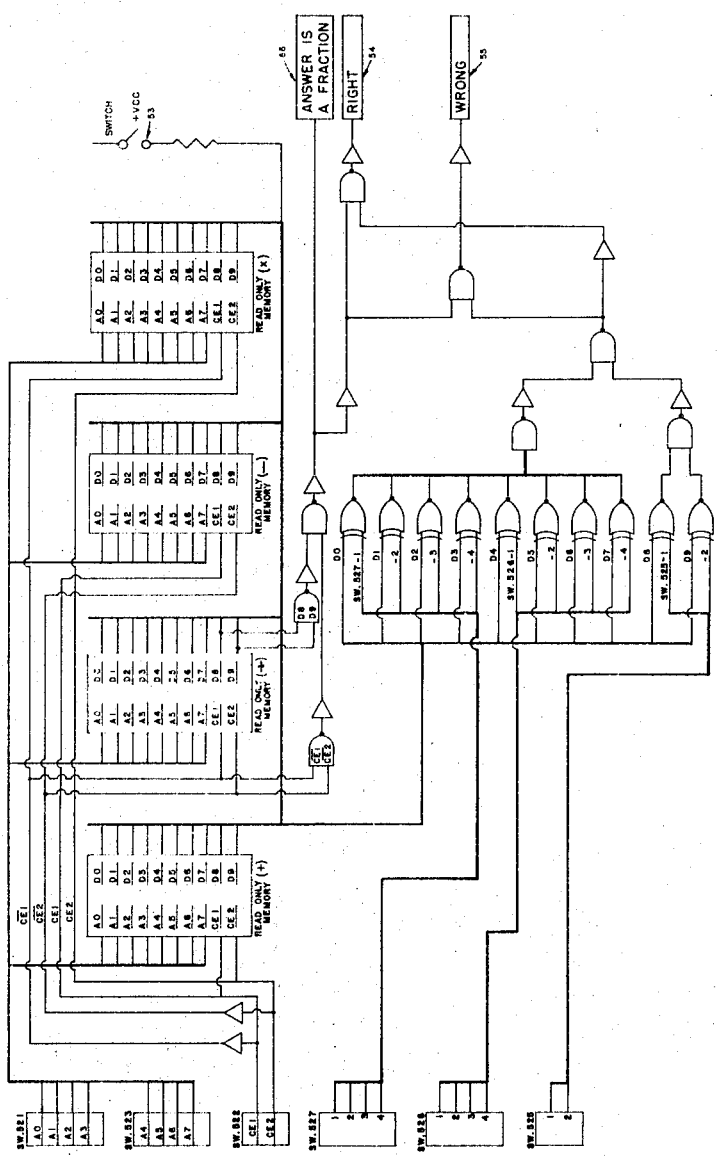
FIG. 4 is a schematic representation of the machine.

FIG. 4 is a schematic diagram of the teaching machine of the present invention. Those familiar with electronic logic will readily see the simplicity of the machine, and, from FIG. 4, be able to construct the machine without further information.

The student will be enticed to use the machine with its switches, lights and button. The student should also be compelled to advance his knowledge of the mathematical facts because he enjoys operating the machine and receiving an immediate RIGHT or WRONG response without suffering the embarrassment of his peers' knowledge when his answer is wrong.

The embodiment shown and described above is only exemplary. We do not claim to have invented all the parts, elements or steps described. Various modifications can be made in the construction, material, arrangement, and operation, and still be within the scope of our invention. The limits of the invention and the bounds of the patent protection are measured by and defined in the following claims. The restrictive description and drawing of the specific example above do not point out what an infringement of this patent would be, but are to enable the reader to make and use the invention.

SUBJECT MATTER CLAIMED FOR PROTECTION:

We claim as our invention:

1. A teaching machine for teaching mathematic tables to a student and for aiding the student to memorize the table COMPRISING:
  a a case,
  b four memories in the case,
  c a function switch means for enabling one of said memories,
  d a first number switch means for addressing the enabled memory,
  e a second number switch means for addressing the enabled memory,
  f an answer switch means for generating a student answer,
  g a comparitor in the case,
  h a display means on the case for displaying the results of the comparitor,
  hh said display means including the following indications
    i right
    ii wrong
    iii the answer is a fraction,
  j said comparitor connected to said enabled memory, said answer switch means, and said display means.

2. The invention as defined in claim 1 with an additional limitation of
  k a spring switch connected to the comparitor which actuates the same when depressed.

3. The invention as defined in claim 1 wherein
  k said memories are
    i an addition memory
    ii a subtraction memory
    iii a multiplication memory
    iv a division memory.

4. The invention as defined in claim 1 with an additional limitation of
  k. said memories all being Read Only Memories.

5. The invention as defined in claim 1 with additional limitations of k said first number switch means, said function switch means, said second number switch means, and said answer switch means, are all aligned on the case in the order named here, and are m all in the form of thumbwheel switches, and n an equals sign printed on the case between the second number switch means and the answer switch means o so that they present an equation in the form commonly presented in algebra texts.

6. The invention as defined in claim 5 with an additional limitation of p a spring switch connected to the comparitor which actuates the same when depressed.

7. The invention as defined in claim 6 wherein q said memories are
   i an addition memory
   ii a subtraction memory
   iii a multiplication memory
   iv a division memory.

8. The invention as defined in claim 7 with an additional limitation of s said memories all being Read Only Memories.

\* \* \* \* \*